United States Patent Office 3,541,612
Patented Nov. 24, 1970

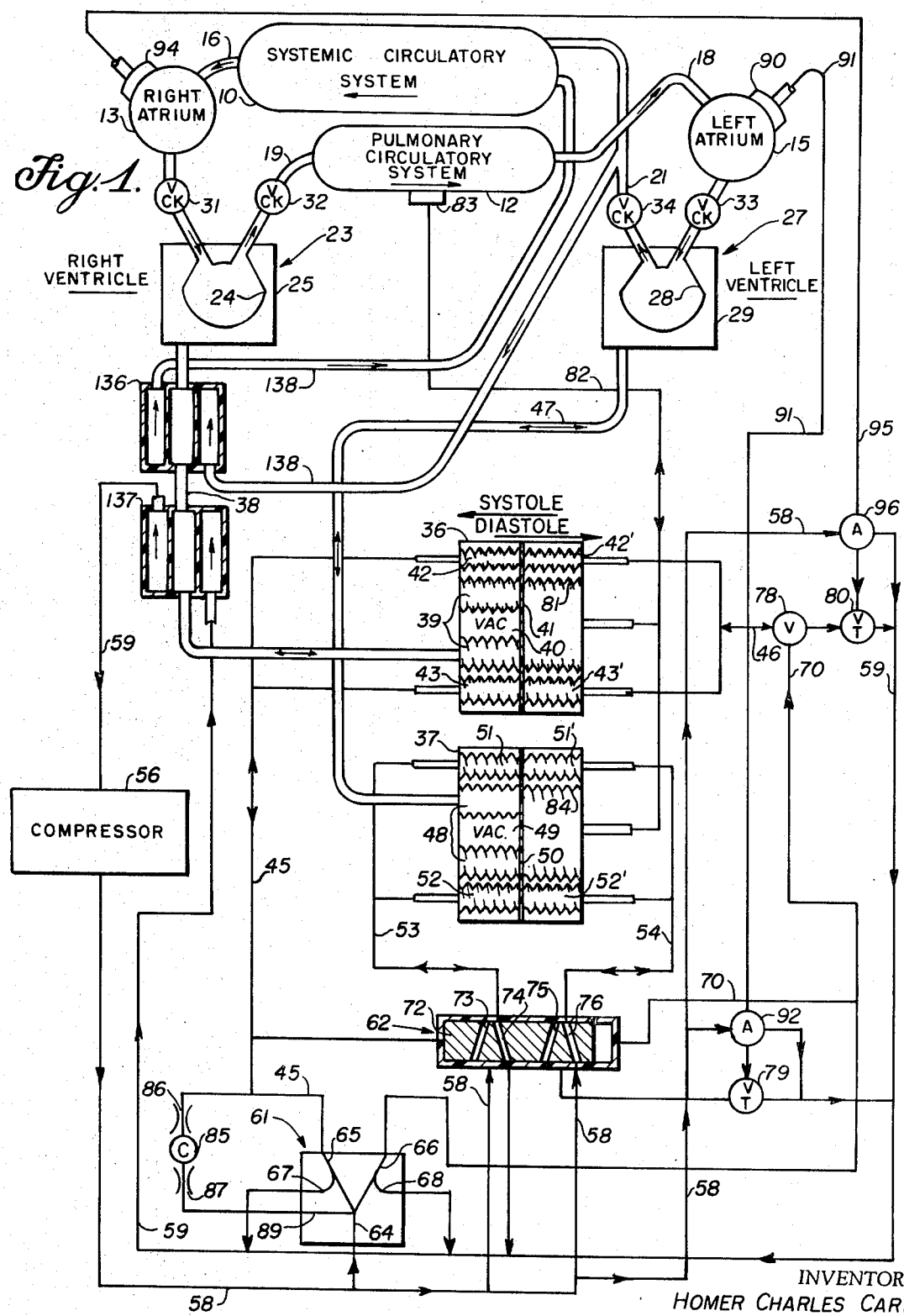

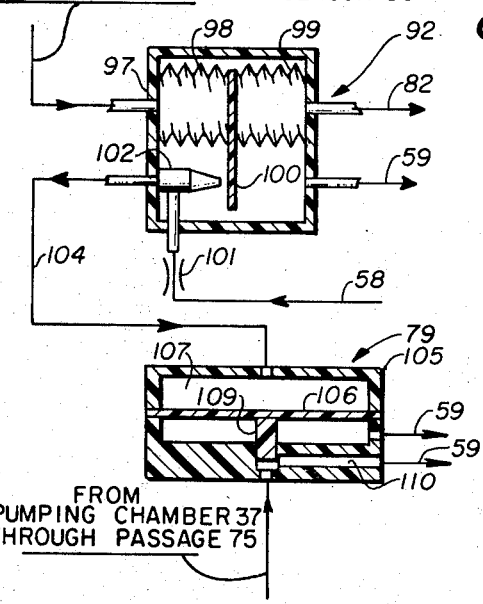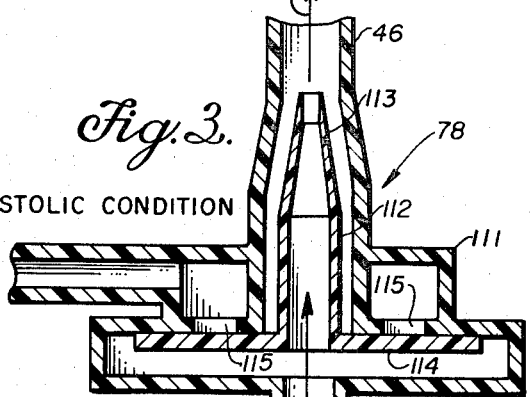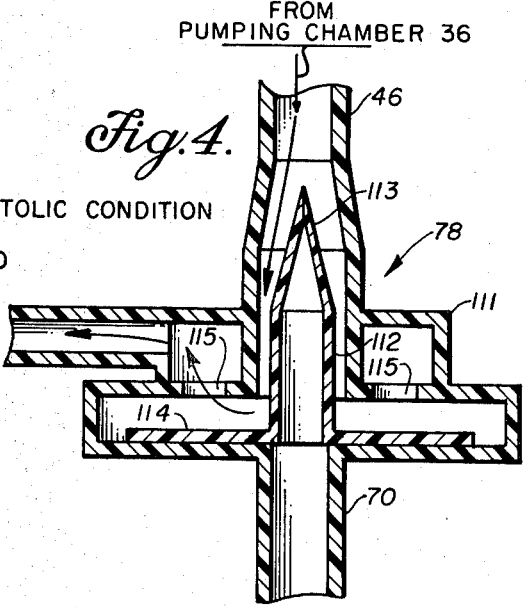

3,541,612
FLUID ACTUATED AND REGULATED ARTIFICIAL IMPLANTABLE HEART SYSTEM
Homer C. Carney, P.O. Box 77,
San Ramon, Calif. 94583
Filed July 11, 1968, Ser. No. 744,221
Int. Cl. A61f 1/24
U.S. Cl. 3—1
7 Claims

ABSTRACT OF THE DISCLOSURE

An artificial heart having right and left ventricles hydraulically actuated with respective bellows pumping chambers that are driven with pairs of opposing pneumatic bellows under control of a fluid switch, whereby the pneumatic bellows for the right ventricle pumping chamber are alternately and oppositely connected to main high and low pressure gas lines through the switch, while the pneumatic bellows for the left ventricle pumping chamber are alternately and oppositely connected directly to the main high and low pressure gas lines.

BACKGROUND OF THE INVENTION

The present invention relates to artificial hearts, and more particularly, it pertains to a closed fluid system for actuating and regulating artificial ventricles.

Various artificial heart systems have been designed and developed for performing selected heart functions. Some of these systems are completely extracorporeal except for the necessary vascular connections, while others are partially intracorporeal and generally utilize an implantable ventricular pump with an extracorporeal power source, pump actuating mechanism, and pump regulating device. The extracorporeal systems have been used for temporarily bypassing the natural heart, such as during surgical procedures or for recuperation of the natural heart. The partially intracorporeal systems have been used experimentally with animals, primarily for testing blood and body reactions to a heart implant, and for evaluating the general feasibility of an implant. However, all of these systems are at least partially extracorporeal and variously require external devices including a power source, tubing, wires, atmospheric vents, regulating and metering equipment, and both automatic and manual controls. Such external equipment renders the recipient generally immobile; and such systems, therefore, become impractical as a heart replacement that will allow a recipient to engage in normal activities. It is therefore required that any practical permanent artificial implantable heart system be a closed system that can be reliably operated over extended periods in accordance with physiological needs.

One physiological need is to maintain natural levels of blood pressure in the circulatory systems. Veins, for example, are easily collapsed and distended by blood pressure variations and should naturally be near ambient atmospheric pressure at all times to maintain their normal shape. In particular, any significant lowering of venous blood pressure from atmospheric pressure will result in collapse of the veins and consequent blood flow stoppage. The pulmonary circulatory system is particularly pressure sensitive in that it contains blood vessels having delicate walls for transport of oxygen to the blood. Consequently, the blood in these vessels must be kept very near ambient atmospheric pressure lest an underpressure rupture of the vessels. An artificial heart system must therefore maintain the blood pressures in the cardiovascular system at natural levels with reference to ambient atmospheric pressure.

It is also required that a permanently implantable artificial heart system be of a size that can be implanted without undue distortion and damage to the body of the recipient. It is highly desirable, therefore, that the power conversion efficiency of all parts of the system be maximized in order to minimize the size of the system. In particular, where the system is to be powered with a radioisotope heat source, the higher the power conversion efficiency the smaller will be the power source and the lower its cost. Maximum efficiency is also desirable to minimize the amount of waste heat that must be transferred to the blood so as to maintain normal physiological temperatures. The system should also be of a simple design to additionally minimize cost so as to make the system widely available. The number of moving parts also should be minimal and the parts arranged to have minimal wear in order to provide long, reliable operation.

SUMMARY OF THE INVENTION

In brief, the present invention pertains to a completely closed, fluid actuated and regulated artificial heart system that is susceptible of being permanently implanted. Because of its simplicity, compactness and low cost, such a system should also find wide use as a surgical and recuperative bypass. The system includes artificial ventricles in the form of a pair of flexible plastic sacs connected to respective atrial remnants and ventricular vessels. The flexible sacs are each mounted in a semirigid container and may be collapsed (systole) and expanded (diastole) with a pumping fluid that is reciprocated with a pair of respective bellows pumping chambers that alternately force and withdraw the fluid in a space between each sac and its respective semirigid container. Each of the pumping chambers are actuated with opposing pairs of driving bellows under control of a fluid switch that is operable for alternately connecting opposing driving bellows to high and low pressure working fluid lines. The right ventricular pumping chamber may be driven at a reduced pressure directly from the fluid switch output since less pressure is required to pump blood from the right ventrical to the pulmonary circulatory system than is required to pump blood from the left ventricle to the systemic circulatory system. The continuous supply of high pressure from the switch to the right ventricular pumping chamber is also utilized to simply and efficiently actuate and hold a switching valve through which pressure is applied directly from the main high and low pressure lines to the left ventricular pumping chamber. This results in a very efficient use of the high pressure working fluid and therefore an efficient use of the power source. This high efficiency leads to a small low cost power source, and a compact system that is of minimal complexity and also low in cost. Regulating means are also provided that are responsive to pressure sensors that may be surgically attached to atrial remnants for independent control of each of the pumping chambers to produce pumping strokes that fulfill the variable blood flow rate and volume requirements of a cardiovascular system. Throughout the artificial system of the invention, simple reciprocating parts are utilized that are arranged to have minimal wear and high reliability over long periods and the system is entirely fluid actuated and regulated. The invention results in a completely closed artificial heart system that is efficient, self-regulating, compact and reliable, and which therefore may be used for a variety of applications of artificial hearts both extracorporeal and intracorporeal.

It is an object of the invention to provide a closed, fluid actuated and regulated, artificial heart system.

Another object is to simply and reliably control a permanently implantable heart pump.

Another object is to minimize the complexity of an artificial heart system.

Another object is to efficiently actuate and regulate an artificial heart system.

Other objects and advantageous features of the invention will be apparent in a description of a specific embodiment thereof, given by way of example only, to enable one skilled in the art to readily practice the invention, and described hereinafter with reference to the accompanying drawing.

BRIEF DESCRIPTION OF THE DRAWING

FIG. 1 is a schematic diagram of a closed, fluid actuated and regulated artificial heart system connected to a cardiovascular system, according to the invention.

FIG. 2 is a schematic diagram of a throttle valve system used in the system of FIG. 1.

FIG. 3 is a cross-sectional view of a two-way check valve utilized in the system of FIG. 1 and shows the valve in a first position.

FIG. 4 is a cross-sectional view of the two-way check valve of FIG. 3 shown in a second position.

DESCRIPTION OF AN EMBODIMENT

Referring to the drawing, there is shown in FIG. 1 a schematically represented artificial heart system connected to a natural physiological system for circulating blood in an animal, and in particular a human. The natural circulatory system is comprised of a systemic circulatory system 10 and a pulmonary circulatory system 12. The natural circulatory system also includes a heart (not shown) that is comprised of right and left ventricles which pump blood through the circulatory systems by rhythmic expansion (diastole) and contraction (systole). The natural heart also includes a right atrium 13 and left atrium 15 for receiving the circulating blood prior to its movement into the ventricles. During diastole blood normally circulates from the systemic system 10 through inferior and superior vena cava 16 to the right atrium and into the right ventricle; blood also circulates from the pulmonary system 12 through a pulmonary vein 18 to the left atrium 15 and into the left ventricle. During systole, blood is forced from the right ventricle through a pulmonary artery 19 to the pulmonary circulatory system; blood is also forced from the left ventricle through an aorta 21 to the systemic circulatory system. In the natural heart, a series of ventricular valves ensure the proper direction of circulation through the heart and circulatory systems.

In the artificial heart system of the invention, the functions of the right and left ventricles of the natural heart are assumed by artificial right and left ventricles 23 and 27, respectively. The right ventricle 23 is comprised of a flexible plastic sac 24 mounted within a semirigid housing 25. The left ventricle is comprised of a similar sac 28 and housing 29. Connection of the artificial ventricles to a natural circulatory system may be made by surgically removing the natural ventricles and ventricular valves and reconnecting the artificial ventricular sacs 24 and 28 to the atrial remnants through artificial ventricular check valves. The inlet to the right ventricular sac 24 is connected through a check valve 31 to the right atrium 13, while the outlet of sac 24 is connected through a check valve 32 to the pulmonary artery 19. The inlet to the left ventricular sac 28 is connected through an artificial check valve 33 to the left atrium 15, while the outlet of sac 28 is connected to the aorta 21 through a check valve 34.

Other purposes for an artificial heart may call for alternative procedures. For example, the same connections as described could be made but without surgically removing the natural ventricles. The natural ventricles in this case would be bypassed. This would be desired in certain cases, as for example, where it is desired to surgically repair the natural ventricles and then allow them to recuperate.

Expansion and contraction of the sacs 24 and 28 may be accomplished by reciprocation of a pumping fluid in the space between the sacs and their respective housings. Pumping fluid reciprocation is effected by means of a right ventricular pumping chamber 36 and a left ventricular pumping chamber 37. The left half of the pumping chamber 36 includes a bellows 39 used as a reservoir and pump for the pumping of fluid to the right ventricle through a line 38. The bellows 39 is cylindrical and has a central space 40 that is evacuated for reasons discussed hereinafter. The bellows 39 is mounted between the pumping chamber housing and an inner diaphragm 41. The diaphragm 41 is movable leftward and rightward for reciprocating the pumping fluid and is moved by means of opposing pairs of driving bellows 42 and 42', and 43 and 43' which are mounted between the pumping chamber housing and the diaphragm 41. The driving bellows are smaller in diameter than the bellows 39 and are mounted at opposite ends of a diameter of the bellows 39. The bellows 42 and 43 commonly communicate with a gas line 45 that is alternately connected to high and low pressure gas lines by means described hereinafter; the bellows 42' and 43' are mounted directly opposite the bellows 42 and 43 and commonly communicate with a gas line 46 which also is alternately, but oppositely, connected to high and low pressure gas lines. The pumping chamber 37 may be made identical to the chamber 36 and may be comprised of a bellows 48 used as a reservoir and pump for reciprocating the pumping fluid to the left ventricle 27 over a line 47; the chamber 37 further includes an inner diaphragm 50, and two pairs of driving bellows 51 and 51', and 52 and 52'. An evacuated chamber 49 is centrally located in the bellows 48. Gas lines 53 and 54 are commonly connected to respective pairs of bellows 51 and 52, and 51' and 52'.

During diastole the driving bellows 42, 43, 51 and 52 are connected through lines 45 and 53 to high pressure gas lines while the bellows 42', 43', 51', and 52' are connected through lines 46 and 54 to low pressure gas lines. Alternately, during systole, the bellows 42, 43, 51, and 52 are connected to low pressure gas lines while the bellows 42', 43', 51' and 52' are connected to high pressure gas lines. These connections are alternated to cause the diaphragms 41 and 50 to move rightward to effect diastole and leftward to effect systole to thereby expand and contract the flexible ventricular sacs 24 and 28, respectively.

A compressor 56 is provided for maintaining high and low pressure working gas respectively in a high pressure line 58 and a low pressure line 59, the direction of the flow in the lines from and to the compressor 56 being indicated by the arrows. The operation of the compressor 56 should be relatively rapid as compared to the diastolic and systolic cycles in order to maintain the pressures in the lines relatively constant. An integral heat engine-compressor, suitable for incorporation as the device 56 in the artificial heart system of FIG. 1, is shown and described in detail in copending U.S. patent application Ser. No. 744,204, filed July 11, 1968.

Alternate application of high and low gas pressures to opposing sets of driving bellows of the pumping chambers 36 and 37 is accomplished by means of a fluid switch 61 and a switching spool valve 62. The fluid switch 61 is of a conventional design generally used for fluid amplifiers. The switch 61 is bistable and includes a high pressure input passage 64, first and second output passages 65 and 66, and low pressure vent passages 67 and 68. Since the switch is bistable, high pressure gas applied through the input passage 64 will flow as a main stream through one or the other of the outputs 65 or 66. The passages 67 and 68 provide gaseous release of entrained gases to stably maintain the main stream in one or the other passages 65 or 66.

In operation, high pressure gas is flowing through one or the other of the outputs 65 or 66, for example, output 66 which is connected by means of a gas line 70 to the right end of the spool valve 62. The spool valve 62 includes a spool 72 slidably mounted within the valve housing for movement rightward and leftward. The spool is formed to have gas passages 73, 74, 75 and 76. Upon application of a high pressure to the right end of the valve over the line 70, the spool 72 is moved fully leftward to thereby connect high pressure gas from the line 58 to the line 54 through the passage 76 and to also connect the line 53 to the low pressure line 59 through the valve passage 74. Under these conditions a high pressure is applied to the bellows 51' and 52', and a low pressure is applied to the bellows 51 and 52 thereby causing the diaphragm 50 to move leftward to effect a systolic cycle. A high pressure is also applied to the bellows 42' and 43' over the gas lines 70 and 46 through a two-way check valve 78. The driving bellows 42 and 43 are connected to a low pressure over the line 45 and the passages 65 and 67 to the low pressure line 59. With a high pressure applied to the bellows 42' and 43' and a low pressure to the bellows 42 and 43, the diaphragm 41 is driven leftward to synchronously effect a systolic cycle simultaneously with the action of the pumping chamber 37. Systole is terminated when the diaphragm 41 cannot be moved further leftward. This causes a pressure buildup in the bellows 42' and 43' and in lines 46 and 70 which is transmitted in a reverse direction to the passage 66 of the switch 61. Such a buildup in the passage 66 causes the main gas stream to switch to the passage 65. A high pressure is thereby applied from the line 58 through the input passage 64 to the line 45 and the left end of the spool valve 62, forcing the spool 72 rightward for connecting the high pressure line 58 to the gas line 53 through the valve passage 73 and further connecting the gas line 54 to the low pressure line 59 through the passage 75 and a throttle valve 79, which valve is more fully described hereinafter. The high pressure in the line 45 is also applied to the bellows 42 and 43 of the chamber 36, while the bellows 42' and 43' are connected over the line 46 through the two-way check valve 78 and a throttle valve 80, similar to the throttle valve 79, to the low pressure line 59. With pressures applied in the manner described, the diaphragms 41 and 50 are moved rightward to synchronously and simultaneously effect a diastolic cycle. The diastolic cycle is terminated when the diaphragm 41 can no longer be moved rightward, thereby causing a pressure buildup in the line 45 which is transmitted to the passage 65, causing the high pressure stream in the switch 61 to switch to the opposite output passage 66 to initate a systolic cycle in the manner described hereinbefore. Systole and diastole are thereby rhythmically accomplished in a manner simulating that of the natural heart for pumping blood through the circulatory systems.

One of the features of the invention, it will be noted, is the simple, highly efficient system that is obtained by indirectly connecting high and low pressures to the valve 62 and the pumping chamber 36 through the switch 61. This arrangement makes advantageous use of the physiological need of less pressure to force blood from the right ventricle 23 through the pulmonary circulatory system 12 to the left atrium 15 than to force blood from the left ventricle 27 during systole through the systemic circulatory system 10. Therefore, for pumping chambers 36 and 37 of equal size, lower differential pressures are required to drive the chamber 36 than are required to drive the chamber 37. The continuous supply of gas that is alternately supplied over lines 45 and 70 to drive the chamber 36 is also used for actuation and holding of the valve 62. The spool 72 is held in place with a continuous high pressure without resort to complex latching mechanisms or inefficient application of a continuous high pressure from a continuously vented fluid switch. The switch 61, therefore, is utilized to simply and efficiently actuate the chamber 36, and to actuate and hold the valve 62 in the proper positions.

Since venous pressure is very near ambient atmospheric pressure at all times in a natural circulatory system, it is necessary in an artificial heart pumping system that the venous pressures likewise be maintained very near ambient atmospheric pressure. Since the venous system includes the vessels through which the blood is returned to the heart, the venous system is particularly sensitive to diastolic pressures. Consequently, particular care must be taken during diastole to prevent a reduction of venous pressure below atmospheric pressure to the point that the veins collapse and stop the flow of blood. In a natural heart this is accomplished by a complete relaxation of the heart muscles during diastole. The heart muscles, therefore, do not exert any force on the blood stream but function only as very flexible sacs which are filled by blood flowing under residual venous pressure at a rate that maintains the venous pressure substantially at atmospheric.

In the present invention, the relaxed state of the ventricles during diastole is simulated in the heart pumping chambers 36 and 37 by maintaining the average pressure on both sides of the diaphragms 41 and 50 substantially equal and substantially at atmospheric pressure. This may be accomplished by referencing the right side of each of the diaphragms 41 and 50 at ambient atmospheric pressure by means of bellows 81 and 84, respectively. Atmospheric pressure is transmitted to the bellows 81 and 84 over an atmospheric pressure reference line 82 from a very flexible sac that may be surgically located in the pulmonary cavity so that it is exposed to atmospheric pressure at all times. The areas of all of the bellows adjacent their respective diaphragms are selected such that during diastole the total force acting rightward on respective diaphragms is only slightly greater than the total leftward force. For example, the summation of forces transmitted rightward against the diaphragm 41 by the driving bellows 42 and 43 plus the force due to venous atmospheric pressure in the bellows 39 is only slightly greater than the force summation transmitted by the bellows 42', 43', and 81 acting leftward. This result is obtained by providing the evacuated space 40 in the bellows 39. The space 40 results in the pumping fluid at atmospheric pressure in the bellows 39 acting rightward over an area that is smaller than the area of the bellows 81 on which atmospheric pressure in the flexible sac 83 is acting leftward. The space 49 permits a similar result in the pumping chamber 36. Venous pressures are thereby maintained at atmospheric pressure during diastole. Furthermore, the difference in effective areas of the bellows 39 and 81, and 48 and 84 results in relative high pressures in the lines 38 and 47 during systole. These pressures correspond to the higher arterial pressures that are physiologically required during systole. The necessary systolic and diastolic pressures are thereby maintained in the circulatory systems regardless of any gross ambient atmospheric changes, thus freeing the recipient for normal activities.

Because of the relaxed condition of the pumping chambers 36 and 37 during diastole, especially during very relaxed bodily activities, it is desirable to ensure that systole is initiated within a normal predetermined period of time even though the pumping chamber 36 has not completed its diastolic movement. This may be accomplished by serially connecting a fluid capacitor with a pair of restrictors 86 and 87 between the output 65 and a switching input 89 of the switch 61. During diastole, high pressure from the output 65 is applied to the capacitor 85. After a predetermined delay, the capacitor will become filled and the pressure from the output 65 will be fed to the switching input 89 to cause the switch 61 to switch its output from the output 65 to the output 66, thereby initiating systole.

In order that the pumping chambers 36 and 37 can respond to physiological needs to supply increased or decreased blood pumping rates, the throttle valves 79 and 80 are provided and made responsive respectively to left and right atrial pressures. This may be accomplished for the chamber 37 by means of a pressure senstive fluid filled sac 90 surgically attached to the left atrium 15. Changing atrial blood pressures in the left atrium are transmitted over a fluid line 91 to a pressure amplifier 92. The amplifier 92 raises the amplitude of the atrial pressure signals for application to the throttle valve 79 for control of the diastolic pumping rate of the chamber 37. Similarly, a pressure sensitive fluid filled sac 94 may be surgically attached to the right atrium 13 for transmitting atrial pressures over a fluid line 95 to a pressure amplifier 96 for control of the throttle valve 80 to regulate the diastolic cycle of the pumping chamber 36.

The valve systems 79 and 92, and 80 and 96 are substantially identical in operation and construction and a description of only one system is deemed necessary. The valve 92 is comprised of a housing 97 (FIG. 2) containing a bellows 98 which is connected to the pressure sensitive fluid sac 90. A bellows 99 is also provided and is connected to the line 82 so as to maintain the bellows 99 at ambient atmospheric pressure. A diaphragm 100 is mounted between the bellows 98 and 99 is moved rightward upon an increase in atrial pressure above atmospheric and leftward upon a decrease. High pressure gas from the line 58 is applied through a restrictor 101 and a cone jet sensor 102 to the interior of the housing 97. The gas from the jet 102 is exhausted from the housing to the low pressure line 59. The core jet sensor 102 has its nozzle positioned adjacent the diaphragm 100. Movement rightward of the diaphragm decreases the pressure within the jet 102 and movement leftward increases the pressure. These pressure variations are transmitted over a line 104 to the throttle valve 79 which is comprised of a housing 105 in which a diaphragm 160 is mounted. A space 107 above the diaphragm connects with the line 104. A plunger 109 is mounted on the lower side of the diaphragm 106. A space beneath the diaphragm connects to the low pressure line 59 to vent any leakage around the plunger 109. Thus, the pressure variations in the line 104, which are in the range of pressures in the high pressure line 58, cause corresponding movement of the diaphragm 106. As the diaphragm is moved downward and upward the plunger 109 tends respectively to restrict or pass gaseous exhaust from the pumping chamber 37 to a passage 110 in the valve housing and hence to the low pressure line 59. In operation, an increase in atrial pressure, corresponding to a physiological need for an increased blood flow rate, causes the diaphragm 100 to be moved rightward, the pressure in the line 104 to be reduced, the diaphragm 106 raised, and the opening to the passage 110 increased to thereby permit a higher rate of diastolic exhaust from the pumping chamber 37. A lowering of atrial pressure produces the opposite effect and decreases the diastolic exhaust rate. Controls are thereby provided that are individually responsive to right and left atrial pressures to fulfill the immediate needs of the natural circulatory system as manifested by natural variations in atrial pressures.

The two-way check valve 78 (shown in detail in FIGS. 3 and 4) permits application of a high pressure from the line 70 to the bellows 42' and 43' during systole and exhaustion of gas from the bellows through the throttle valve 80 during diastole without interaction with the pressure in the line 70. In FIG. 3, the valve 78 is shown in the systolic condition while in FIG. 4 the valve is shown in its diastolic condition. The valve 78 is comprised of a housing 111 that connects with the lines 46 and 70. A movable element 112 is mounted in the housing and has a flexible tip 113 extending toward the connection to the line 46. The element 112 also includes a flange 114 which, in cooperation with the housing 111, limits the movement of the element 112. In the systolic condition (FIG. 3), high pressure in the line 70 forces the element 112 upward to close a group of vents 115 which lead to valve 80. High pressure in the line 70 also opens the flexible tip 113 to permit gas to flow to the bellows 42' and 43'. During diastole the condition of the valve 78 is that shown in FIG. 4 whereby a low pressure is applied from the line 59 through the passages 66 and 68 to the line 70; and a relatively higher diastolic exhaust pressure through line 46 forces the element 112 to move downward and the flexible tip 113 to close. This prevents the gas from the bellows 42' and 43' from exhausting to the line 70 and also opens direct passages from the line 46 through the vents 115 to the valve 80 for controlling the diastolic exhaust rate of the bellows 43 in the manner described hereinbefore.

In order to dissipate the heat energy that remains in the working gas after operation of the bellows and the control system, and to maintain the required low pressure in the line 59, a pair of heat exchangers 136 and 137 (FIG. 1) are provided for transferring excess heat in the working gas to the pumping fluid for dissipation in the circulatory system. The output of the heat exchanger 137 is serially connected in the line 38 through which pumping fluid is reciprocated between the ventricle 23 and pumping chamber 36. The input to the exchanger 137 is serially connected in the low pressure line 59 near its termination at the compressor 56. Heat is transferred thereby from the gas in the low pressure line 59 to the pumping fluid in the line 38. A portion of the heat is then carried to the ventricle 23 for transfer directly through the wall of the sac 24 to the blood that fills the sac. The remainder of the heat is transferred from the pumping fluid in line 38 to the blood stream by means of the heat exchanger 136 which has its input serially connected with the line 38 and its output serially connected with lines 138 which bypass blood from the aorta to the systemic circulatory system.

It is deemed preferable that the pumping fluid should be a liquid having the heat transfer characteristics and viscosity of water, but it also should be a nonpolar fluid in order to minimize any reaction between the blood and the pumping fluid which may result from permeation of the blood or fluid through the thin flexible sacs 24 and 28. Liquid fluorocarbons or silicones have these desired characteristics.

While an embodiment of the invention has been shown and described, further embodiments or combinations of those described herein will be apparent to those skilled in the art without departing from the spirit of the invention or from the scope of the appended claims.

I claim:

1. In an artificial heart system including right and left fluid actuated artificial ventricles and right and left fluid pumping means connected to said right and left ventricles respectively, wherein each of said pumping means have first and second fluid pressure inputs, and a pumping fluid output connected to the respective one of said artificial ventricles, for reciprocating a pumping fluid to actuate the respective artificial ventricle to effect systole and diastole, the combination of:
   (a) a high pressure line containing a working fluid at a high pressure;
   (b) a low pressure line containing a working fluid at a low pressure;
   (c) switching means operable for simultaneously connecting said first inputs of said right and left pumping means to said high pressure line and for connecting said second inputs of said right and left pumping means to said low pressure line to effect diastole; and
   (d) means responsive to full actuation of said right pumping means for actuating said switching means to simultaneously connect said first inputs of said right and left pumping means to said low pressure line and said second inputs of said right and left pumping means to said high pressure line to effect systole.

2. The combination of claim 1, wherein said switching means includes a fluid switch having an input connected to said high pressure line, and first and second outputs connected to said first and second inputs of said right pumping means.

3. The combination of claim 2, wherein said switching means further includes a switching valve connected to said first and second outputs of said fluid switch and operable thereby for connecting said first input of said left pumping means directly to said high pressure line simultaneous with the connection of said high pressure line through said switch input and first switch output to said first input of said right pumping means.

4. The combination of claim 1, further including:
right and left fluid pressure sensing means for sensing right and left atrial pressures in atrial remnants of a natural heart system,
right and left throttle valve means connected respectively between said second inputs of said right and left pumping means and said low pressure line, each of said throttle valve means being responsive to respective right and left atrial pressure sensing means for controlling the rate of exhaust of working fluid from said second input of respective pumping means to said low pressure line.

5. The combination of claim 4, further including a double check valve connected between said right throttle means and said second input of said right pumping chamber and between said switching means and said right pumping chamber, said double check valve being operable for transmitting fluid pressure directly from said switching means to said right pumping means during systole, and further operable during diastole for connecting said second input of said right pumping means directly to said right throttle valve means.

6. The combination of claim 1, wherein:
said switching means includes a switching input, and further including delay means, and
means for connecting said delay means between said first output and said switching input of said switching means to actuate said switching means to alternate the high and low pressure line connections to said right and left pumping means after a predetermined diastolic period.

7. The combination of claim 1, wherein said pumping fluid is a liquid and said working fluid is a gas.

References Cited

UNITED STATES PATENTS

| | | | |
|---|---|---|---|
| 3,182,335 | 5/1965 | Bolie | 3—1 |
| 3,208,448 | 9/1965 | Woodward | 128—1 |
| 3,379,191 | 4/1968 | Harvey | 3—1 XR |
| 3,434,162 | 3/1969 | Wolfe | 3—1 |

OTHER REFERENCES

"The Artificial Heart-Exemplar of Medical-Engineering Enterprise" by Nilo Lindgren IEEE Spectrum, vol. 2, No. 9, September 1965, pp. 67–83.

RICHARD A. GAUDET, Primary Examiner

R. L. FRINKS, Assistant Examiner

U.S. Cl. X.R.

128—1